(12) United States Patent
Ichikawa et al.

(10) Patent No.: US 8,566,084 B2
(45) Date of Patent: Oct. 22, 2013

(54) SPEECH PROCESSING BASED ON TIME SERIES OF MAXIMUM VALUES OF CROSS-POWER SPECTRUM PHASE BETWEEN TWO CONSECUTIVE SPEECH FRAMES

(75) Inventors: Osamu Ichikawa, Kanagawa-ken (JP); Masafumi Nishimura, Kanagawa-ken (JP)

(73) Assignee: Nuance Communications, Inc., Burlington, MA (US)

( * ) Notice: Subject to any disclaimer, the term of this patent is extended or adjusted under 35 U.S.C. 154(b) by 148 days.

(21) Appl. No.: 13/150,804

(22) Filed: Jun. 1, 2011

(65) Prior Publication Data

US 2011/0301945 A1     Dec. 8, 2011

(30) Foreign Application Priority Data

Jun. 4, 2010  (JP) ................. 2010-128443

(51) Int. Cl.
*G10L 15/02*    (2006.01)

(52) U.S. Cl.
USPC ........................................ 704/211; 704/218

(58) Field of Classification Search
USPC ....................................................... 704/205
See application file for complete search history.

(56) References Cited

U.S. PATENT DOCUMENTS 5,754,974 A * 5/1998 Griffin et al. .................. 704/206
5,781,881 A * 7/1998 Stegmann ..................... 704/211
2003/0144839 A1* 7/2003 Dharanipragada et al. ... 704/246
2005/0241465 A1* 11/2005 Goto .............................. 84/616

(Continued)

FOREIGN PATENT DOCUMENTS

JP  2001-100763 A   4/2001
JP  3744934         2/2006

OTHER PUBLICATIONS

"Use of the Crosspower-Spectrum Phase in Acoustic Event Location" M. Omologo and P. Svaizer/ IEEE Transactions on Speech and Audio Processing, vol. 5, No. 3, May 1997.*

(Continued)

*Primary Examiner* — Jialong He
*Assistant Examiner* — Jie Shan
(74) *Attorney, Agent, or Firm* — Wolf, Greenfield & Sacks, P.C.

(57) ABSTRACT

A speech signal processing system which outputs a speech feature, divides an input speech signal into frames so that each pair of consecutive frames have a frame shift length equal to at least one period of the speech signal and have an overlap equal to at least a predetermined length, applies discrete Fourier transform to each of the frames, calculates a CSP coefficient for the pair, searches a predetermined search range in which a speech wave lags a period equal to at least one period to obtain the maximum value of the CSP coefficient for the pair, and generates time-series data of the maximum CSP coefficient values arranged in the order in which the frames appear. A method and a computer readable article of manufacture for the implementing the same are also provided.

15 Claims, 7 Drawing Sheets

(a)

(b)

(56) References Cited

U.S. PATENT DOCUMENTS

| | | | |
|---|---|---|---|
| 2006/0083407 A1* | 4/2006 | Zimmermann et al. | 382/107 |
| 2006/0184366 A1* | 8/2006 | Hidaka et al. | 704/240 |
| 2006/0215854 A1* | 9/2006 | Suzuki et al. | 381/98 |
| 2007/0203700 A1* | 8/2007 | Toyama | 704/251 |
| 2008/0027708 A1* | 1/2008 | Ramakrishnan et al. | 704/200.1 |
| 2009/0110209 A1* | 4/2009 | Li et al. | 381/73.1 |
| 2009/0304200 A1* | 12/2009 | Kim et al. | 381/71.11 |
| 2010/0008516 A1* | 1/2010 | Ichikawa et al. | 381/92 |
| 2010/0204991 A1* | 8/2010 | Ramakrishnan et al. | 704/246 |
| 2012/0177223 A1* | 7/2012 | Kanamori et al. | 381/94.7 |

OTHER PUBLICATIONS

Y. Atake, at al.,"Robust Fundamental Frequency Estimation Using Instantaneous Frequencies of Harmonic Compponents",ICLP 2000.

E. Sueyoshi, et al.,"Utilization of long term phase spectrum for speech recognition", The 2009 Spring Meeting of Acoustical Society of Japan, pp. 161-164, 2009.

Japanese Notice of Rejection for Japanese Application No. 2010-128443 mailed Jul. 9, 2013.

* cited by examiner (a)

(b)

(a)

(b)

| CENSREC-2(Condition 1) (except car-audio cases) | | WORD RECOGNITION RATE (%) | | | |
|---|---|---|---|---|---|
| | | Baseline | Inter-frame CSP feature | Inter-frame DS | Soft mask |
| | | 39 dim | 39+1 dim | 39 dim | 39 dim |
| IDLING | WITHOUT AIR-CONDITIONING | 93.91 | 97.39 | 96.38 | 96.67 |
| | WITH AIR-CONDITIONING | 93.96 | 95.44 | 94.50 | 93.96 |
| LOW-SPEED CRUISING | WITHOUT AIR-CONDITIONING | 89.04 | 89.04 | 91.43 | 90.04 |
| | WITH AIR-CONDITIONING | 88.09 | 88.70 | 89.00 | 90.11 |
| HIGH-SPEED CRUISING | WITHOUT AIR-CONDITIONING | 79.29 | 86.12 | 85.82 | 85.51 |
| | WITH AIR-CONDITIONING | 79.65 | 83.44 | 82.21 | 82.72 |
| AVERAGE | | 87.41 | 89.62 | 89.54 | 89.58 |

FIG. 8

SPEECH PROCESSING BASED ON TIME SERIES OF MAXIMUM VALUES OF CROSS-POWER SPECTRUM PHASE BETWEEN TWO CONSECUTIVE SPEECH FRAMES

CROSS-REFERENCE TO RELATED APPLICATION

This application claims priority under 35 U.S.C. §119 from Japan Patent Application No. 2010128443 filed Jun. 4, 2010, the entire contents of which are incorporated herein by reference.

BACKGROUND OF THE INVENTION

1. Technical Field

The present invention relates to a technique to process a speech signal to output a speech feature by using phase information contained in a speech signal.

2. Related Art

Although the robustness of speech recognition systems against noise is being constantly improved, the recognition accuracy under harsh conditions is not high enough. For example, it is known that the recognition rates are very low under very low signal-to-noise ratio (SNR) conditions such as in an automobile that is running at high speed or running with air-conditioning on or in an environment where non-stationary noise such as music or street noise is present. Many approaches have been considered with the aim of improving speech recognition in noisy environments. One of such approaches is to use a feature that is robust against noise.

Features such as cepstra, derived from the spectrum intensity of speech, have been mainly used in conventional speech recognition. Phase information contained in speech signals is discarded in such speech recognition.

Eiichi Sueyoshi et al.; "Utilization of Long-Term Phase Spectrum for Speech Recognition", Proceedings of the meeting of the Acoustical Society of Japan, March 2009, pp. 161-164 discloses a method that uses conventionally discarded phase information in speech recognition. More specifically, Sueyoshi et al. discloses a method that uses a phase spectrum obtained by analyzing phase information over a long period of time as a feature in order to improve the performance of speech recognition.

Japanese Patent No. 3744934 discloses a technique that evaluates the continuousness of an acoustic feature to determine a speech segment. More specifically, Japanese Patent No. 3744934 discloses a method in which the continuousness of a harmonic structure is evaluated with a value of inter-frame correlation in spectrum intensity shape to determine a speech segment.

In Sueyoshi et al., an experiment shows that the proposed phase spectrum has speech recognition capability. However, Sueyoshi et al. shows only that the proposed phase spectrum feature, even in conjunction with mel-frequency cepstral coefficients, is slightly effective for speaker recognition in a noisy environment with a rather high SNR of 20 dB.

Japanese Patent No. 3744934, on the other hand, discloses the use of the harmonic structure's property of being continuous across temporally consecutive frames for speech recognition. However, Japanese Patent No. 3744934 discloses the technique to evaluate the inter-frame correlation of power spectrum components consisting only of a harmonic structure left to determine whether a segment is a vowel segment or not in order to extract a voiced segment with a high accuracy. The power spectrum consisting only of the harmonic structure does not contain phase information and the fine shapes of power spectrum components in general are susceptible to noise.

SUMMARY OF THE INVENTION

The present invention solves the problems described above and provides a technique to extract a feature that is robust against noise by using phase information contained in a speech signal and therefore is capable of improving the accuracy of speech recognition even under a very low SNR condition. The phase of a vowel (voiced) segment contained in a speech signal has the property of being stable in a time-frequency domain. Therefore, to solve the problems described above, the present inventor conceived the idea of using the stability of phase as a feature, rather than using phase information itself as disclosed in Sueyoshi et al, The first aspect of the present invention provides a speech signal processing system including: framing unit dividing an input speech signal into frames so that a pair of consecutive frames have a frame shift length greater than or equal to one period of the speech signal and have an overlap greater than or equal to a predetermined length; discrete Fourier transform means applying discrete Fourier transform to each of the frames and outputting a spectrum of the speech signal; CSP coefficient calculation means for calculating a Cross-Power Spectrum Phase (CSP) coefficient of the spectrum of each of the pairs of consecutive frames; a phase information obtaining unit searching, for each pair of consecutive frames, a predetermined search range in which a speech wave lags a period longer than or equal to one period of the wave for a maximum value of the CSP coefficient to obtain the maximum value of the CSP coefficient; and a time-series data generation unit generating, as a speech feature, time-series data of the maximum values of the CSP coefficient arranged in the order in which the frames appear Another aspect of the present invention provides a speech signal processing method performed on a computer including a processor and a memory, including the steps of: dividing an input speech signal into frames so that a pair of consecutive frames have a frame shift length greater than or equal to one period of the speech signal and have an overlap greater than or equal to a predetermined length, and storing the frames in the memory; applying discrete Fourier transform to each of the frames and outputting a spectrum of the speech signal and storing the spectrum in the memory; calculating a Cross-Power Spectrum Phase (CSP) coefficient of the spectrum of each of the pairs of consecutive frames and storing the CSP coefficient in the memory; searching, for each pair of consecutive frames, a predetermined search range in which a speech wave lags a period longer than or equal to one period of the wave for a maximum value of the CSP coefficient to obtain the maximum value of the CSP coefficient and storing the maximum value in the memory; and generating, as a speech feature, time-series data of the maximum values of the CSP coefficient arranged in the order in which the frames appear.

Another aspect of the present invention provides a computer readable article of manufacture tangibly embodying computer readable instructions which when executed causes a computer to carry out the steps of a method for speech signal processing including the steps of: dividing an input speech signal into frames so that a pair of consecutive frames have a frame shift length greater than or equal to one period of the speech signal and have an overlap greater than or equal to a predetermined length, and storing the frames in the memory; applying discrete Fourier transform to each of the frames and outputting a spectrum of the speech signal and storing the spectrum in the memory; calculating a Cross-Power Spectrum Phase (CSP) coefficient of the spectrum of each of the pairs of consecutive frames and storing the CSP coefficient in the memory; searching, for each pair of consecutive frames, a predetermined search range in which a speech wave lags a period longer than or equal to one period of the wave for a maximum value of the CSP coefficient to obtain the maximum value of the CSP coefficient and storing the maximum value in the memory; and generating, as a speech feature, time-series data of the maximum values of the CSP coefficient arranged in the order in which the frames appear.

BRIEF DESCRIPTION OF THE DRAWINGS

FIG. 8 is a table showing an example of results of an experiment for evaluating the present invention in noisy environments.

DETAILED DESCRIPTION OF THE PREFERRED EMBODIMENTS

Figure 1:
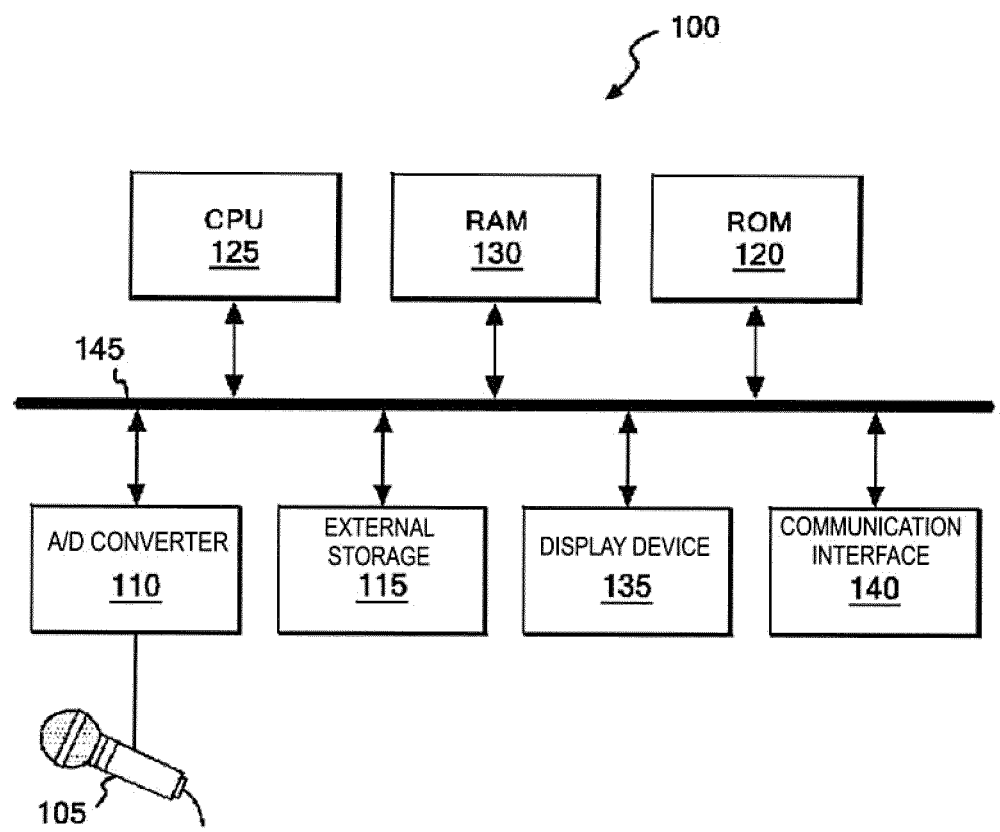
FIG. 1 is a diagram illustrating a hardware configuration of a computer suited to implementing a speech signal processing system according to an embodiment of the present invention.

The best mode for carrying out the present invention will be described below in detail with reference to drawings. The embodiments described below are not intended to limit the present invention defined in the claims and not all of the combinations of features described in the embodiments are essential to the inventive means for solving the problems.

Preferably, the predetermined search range is a range from $-L/2$ to $+L/2$ with respect to the start position of the later one of the pair of consecutive frames, where L is the period of a wave having a lowest fundamental frequency of 100 Hz among possible human speech waves.

Preferably, the frame shift length is 10 msec which is a length in which a wave having the lowest fundamental frequency of 100 Hz among the possible human speech waves fits.

Preferably, the speech signal processing system further includes vowel enhancement means for matching, for each pair of consecutive frames, the phases of the spectra of the pair of frames on the basis of the value of an index that maximizes the CSP coefficient obtained for the pair in the predetermined search range and adding the spectra together; and feature vector calculation means receiving an output from the vowel enhancement means as an input, extracting a speech feature from the input, and outputting the speech feature along with the time-series data of the maximum values of the CSP coefficient as a speech feature vector.

Preferably, the speech signal processing system further includes: masking means for calculating, for each pair of the consecutive frames, a masker weakening the spectrum of a frequency bin in which the signs of the spectra of the pair do not match when the spectra are compared with each other in a position where a phase lag between the spectra is minimized on the basis of the value of an index that maximizes the CSP coefficient obtained for the pair in the predetermined search range and applying the masker to the spectrum of one of the pair; and feature vector calculation means receiving an output from the masking means as an input, extracting a speech feature from the input, and outputting the speech feature along with the time-series data of the maximum values of the CSP coefficient as a speech feature vector.

The feature vector calculation means which receives an output from the vowel enhancement means or the masking means as an input may extract any feature that can be calculated by a known calculation method, such as a combination of a cepstral coefficient such as MFCC and its delta (first order difference) and delta-delta (second-order difference), or LDA (Linear Discriminant Analysis), which is a linear transform of these.

The present invention has been described above as a speech signal processing system, the present invention can be considered to be a speech signal processing method for extracting a speech feature though computation by a computer including a processor and memory, and a speech signal processing program product for extracting a speech feature to be executed on a computer including a processor and a memory.

According to the present invention, since the stability of the phase of a vowel part of a speech signal is used as a feature, a speech recognition processing system that uses the feature can achieve a high accuracy of speech recognition even under a very low SNR condition. Other advantages of the present invention will be appreciated from the following description of embodiments.

FIG. 1 illustrates an exemplary hardware configuration of a computer 100 for carrying out the present invention. Sound produced near a microphone 105 in FIG. 1 is input into an analog-to-digital (A-D) converter 110 through the microphone 105 as an analog signal and is converted at the A-D converter 110 to a digital signal that a CPU 125 can process.

Sound captured by the microphone 105 of a car navigation system, for example, includes hum of air-conditioner, engine noise, honking horns and other sound in addition to voices of a driver and passengers.

An external storage 115 and a ROM 120 can work with an operation system to provide instructions to the CPU 125 and can store codes of computer programs including a speech signal processing program module for carrying out the present invention and various data. The computer programs stored on the external storage 115 and the ROM 120 are loaded onto a RAM 130 and are executed by the CPU 125. The external storage 115 is connected to a bus 140 through a controller (not shown) such as a SCSI controller.

The computer programs can be compressed or divided into units and recorded on multiple media. Processing performed by the CPU 125 on a digital signal provided from the A-D converter 110 according to the speech signal processing program product will be described later in detail.

The computer 100 also includes a display device 135 for presenting visual data to a user. The display device 135 is connected to the bus 145 through a graphics controller (not shown). The computer 100 can connect to a network through a communication interface 140 to communicate with other computers and devices.

The components described above are illustrative and not all of the components are essential components of the present invention. Similarly, it will be understood that the computer 100 for carrying out the present invention can include other components, for example, input devices such as a keyboard, a mouse, or speakers.

Figure 2:
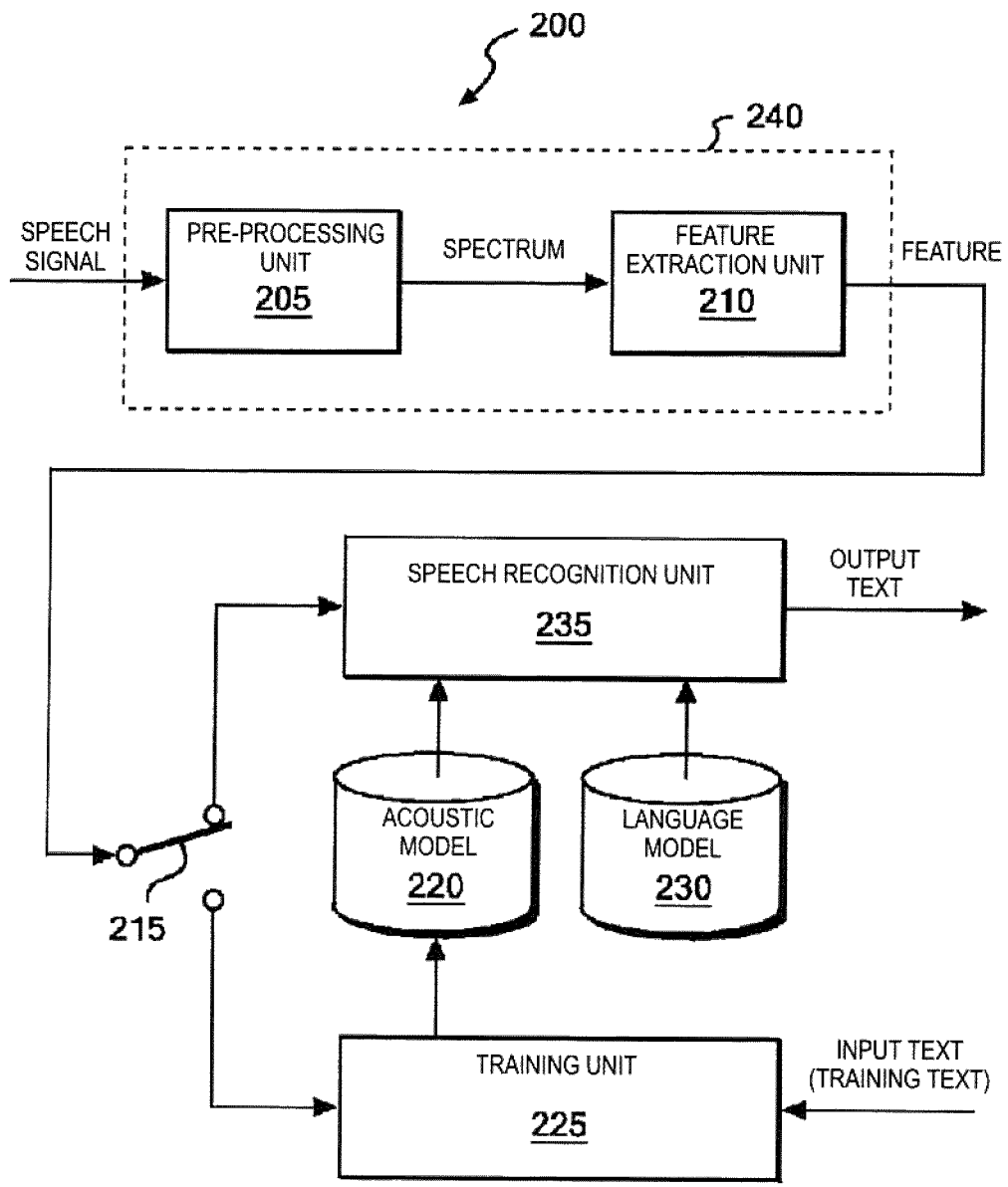
FIG. 2 illustrates a configuration of a conventional speech recognition device.

FIG. 2 illustrates a configuration of a typical conventional speech recognition device 200. A pre-processing unit 205 receives a digital speech signal converted from an analog speech signal, divides the signal into frames by an appropriate method such as a Hann window or a Hamming window, then applies discrete Fourier transform to the frames to output spectra of the speech signal. Optionally, the pre-processing unit 205 can also perform processing for addressing noise. For example, the pre-processing unit 205 can enhance only a desired speech signal coming from a particular direction with a microphone array to relatively weaken noise or can eliminate noise from spectra by a method such as spectrum subtraction to leave only a desired speech signal.

A feature extraction unit 210 receives a spectrum of a speech signal (or a spectrum of a speech signal from which noise was eliminated), extracts a static or dynamic feature, and outputs the feature. Conventionally, a combination of an MFCC (Mel-Frequency Cepstral Coefficient) and its delta (first-order, difference) and delta-delta (second-order difference), or linear transforms of these are often used. They are extracted as static or dynamic features.

A switch 215 is turned to a training unit 225 position during training. The training unit 225 receives a feature extracted from a speech signal by the feature extraction unit 210 as training data and an input text corresponding to the speech signal as training data and builds an acoustic model 220 from the data. The training process itself is not a subject matter of the present invention and therefore further description of the training process will be omitted.

The switch 215 is turned to a speech recognition unit 235 position during recognition. The speech recognition unit 235 receives a feature extracted from a speech signal by the feature extraction unit 210 as recognition data and data from the acoustic model 220 and data from a language model 230, recognizes a speech signal from these data, and outputs a text it recognized. The speech recognition process itself is not a subject matter of the present invention and therefore further description of the speech recognition process will be omitted.

Figure 3:
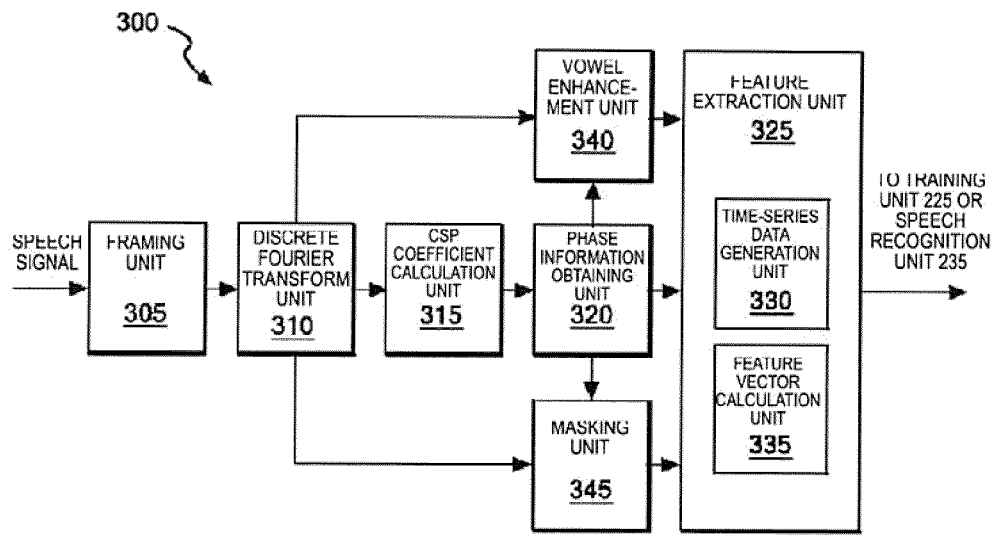
FIG. 3 illustrates a functional configuration of a speech signal processing system 300 according to an embodiment of the present invention.

In this way, the speech recognition device 200 builds an acoustic model 220 from a speech signal and an input text during training and outputs a text it recognized from an input signal, the acoustic model 220 and the language model 230 during recognition. The present invention improves the conventional feature extraction unit 210 and pre-processing unit 205 enclosed in the rectangle 240 in FIG. 2 by using phase information contained in a speech signal but discarded in conventional speech recognition. Referring to FIG. 3, a speech signal processing system 300 according to an embodiment of the present invention, which corresponds to the part enclosed in the rectangle 240 in FIG. 2, will be described below.

FIG. 3 illustrates a functional configuration of the speech signal processing system 300 according to an embodiment of the present invention. The speech signal processing system 300 according to the embodiment of the present invention includes a framing unit 305, a discrete Fourier transform unit 310, a CSP coefficient calculation unit 315, a phase information obtaining unit 320, a feature extraction unit 325, a vowel enhancement unit 340, and a masking unit 345. The feature extraction unit 325 includes a time-series data generation unit 330 and a feature vector calculation unit 335.

The framing unit 305 divides an input speech signal into frames so that each pair of consecutive frames has a frame shift length greater than or equal to one period of the speech signal and also has an overlap greater than or equal to a predetermined length. The operation will be described with reference to FIG. 4.

Figure 4:
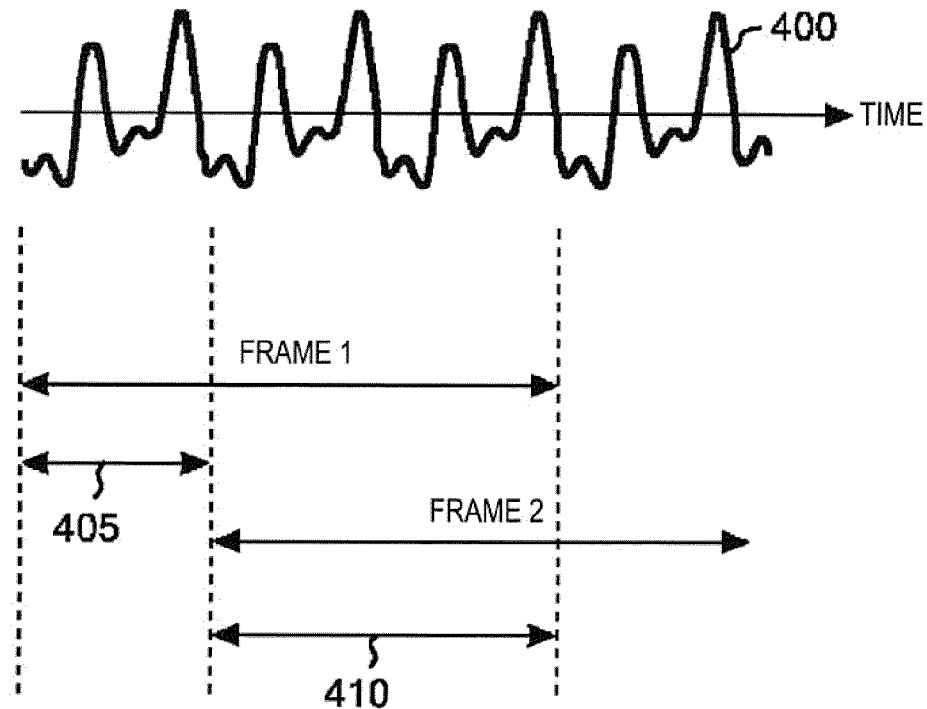
FIG. 4 is a diagram illustrating how a speech signal is divided into frames.

Reference numeral 400 in FIG. 4 indicates an input speech signal. Frames 1 and 2 represented by arrows are a pair of consecutive frames. The framing unit 305 divides the speech signal into frames so that the frame shift length, which is a lag 405 between frames 1 and 2, is greater than or equal to one period of the speech signal and frames 1 and 2 have an overlap 410 greater than or equal to a predetermined length. A known conventional method such as a Hann window or a Hamming window can be used for the division into frames.

The speech signal is divided in this way for the following reason: in the present invention, a CSP coefficient for a pair of consecutive frames is calculated at the CSP coefficient calculation unit 315, which will be described later, in order to use the stability of the phase of a vowel part as a feature; if a short frame shift length is used in order to strengthen the correlation in the vowel part, correlation with a wave without a lag, rather than the wave one period behind, is likely to be obtained; on the other hand, if a long frame shift length is used, the overlap of the consecutive frames will be short and a strong correlation in the vowel part cannot be obtained; therefore the framing unit 305 divides the speech signal into frames in such a way that each pair of consecutive frames has a frame shift length greater than or equal to one period of the speech signal and also has an overlap greater than or equal to a predetermined length.

The fundamental frequencies of human voices are approximately in the range of 100 Hz to 400 Hz. Accordingly, a shift length in which a wave having the longest wavelength, 100 Hz fits, that is, 10 msec, or more is required. However, in order to lengthen the overlap, the shift length needs to be as short as possible, as described above. Therefore, preferably the frame shift length is chosen to be 10 msec, so that a wave with a fundamental frequency of 100 Hz, which is the lowest of the frequencies of waves of possible human voices, fits in the shift length.

The discrete Fourier transform unit 310 receives an output from the framing unit 305, applies discrete Fourier transform such as Fast Fourier Transform (FFT) to each frame, and outputs the spectra of the speech signal.

The CSP coefficient calculation unit 315 receives an output from the discrete Fourier transform unit 310 and calculates a CSP coefficient for each pair of consecutive frames. The CSP coefficient is calculated as:

$$CSP_T(k) = IDFT\left[\frac{DFT(S_T) \cdot DFT(S_{T-1})^*}{|DFT(S_T)||DFT(S_{T-1})|}\right] \quad \text{[Equation 1]}$$

where $S_{T-1}$ and $S_T$ represent the T−1-th frame and the T-th frame, respectively, of the speech signal, DFT and IDFT represent discrete Fourier transform and its inverse transform, $CSP_T(k)$ represents the CSP coefficient of the T-th frame, k represents an index (phase index), and * represents a complex conjugate number.

The phase information obtaining unit 320 receives an output from the CSP coefficient calculation unit 315 and searches a predetermined search range for the maximum CSP coefficient value to obtain an index that maximizes the CSP coefficient and the maximum CSP coefficient value for each pair of consecutive frames. The predetermined range is such that a speech wave will lag one period or longer behind the previous one. The reason for limiting the range in which the maximum CSP coefficient value is searched for in this way will be described below.

The CSP coefficient calculation unit 315 obtains the CSP coefficient for each pair of consecutive frames as a vector size equal to the length of discrete Fourier transform (the number of samples, which is 512 in many settings). If all of the 512 samples are searched through for the maximum CSP coefficient and the shift length of consecutive frames T−1 and T is less than or equal to 256 samples, it is possible that correlation between a wave and the current wave without a lag of one period will be obtained. In that case, always the maximum correlation, namely 1, is taken naturally. Therefore, the phase information obtaining unit 320 of the present invention searches a predetermined search range such that a speech wave lags one period or longer behind for the maximum value of the CSP coefficient.

Such a predetermined search range will be described with reference to the speech signal 500 in FIG. 5(a). For consecutive frames 1 and 2 represented by arrows, the search range can be the range 515 from L/2 before the start position 505 of later frame 2 to L/2 after the start position 505, where L is the period of a wave 510 having the lowest fundamental frequency of 100 Hz among the possible waves of human voices and can be calculated as L=f/100, where f is the sampling frequency. When the search range is limited in this way to obtain the maximum CSP coefficient value, the index, k, that maximizes the CSP coefficient is expressed as:

$$K = \underset{-L/2 < k < L/2}{\operatorname{argmax}} CSP_T(k) \quad \text{[Equation 2]}$$

Figure 5:
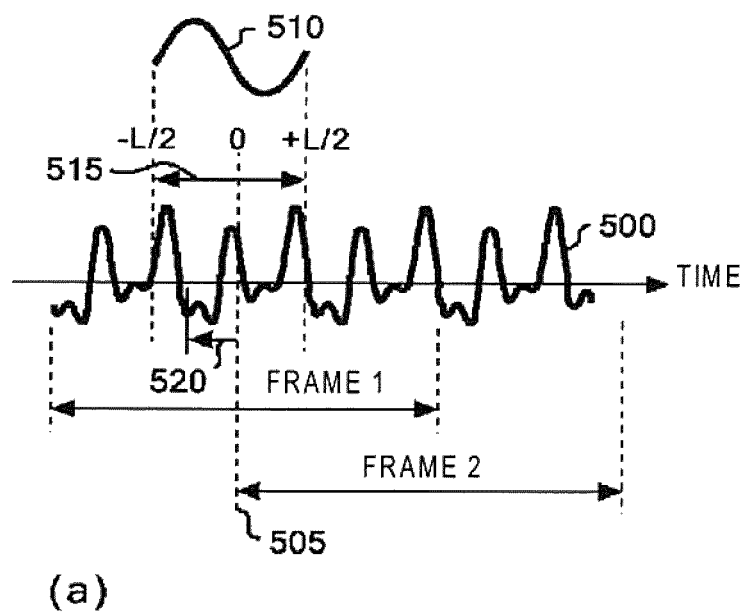
FIG. 5(a) is a diagram illustrating a search range to be searched for a maximum value of a CSP coefficient.
FIG. 5(b) is a diagram comparing indices that maximize the CSP coefficient for two pairs of consecutive frames.
Figure 5:
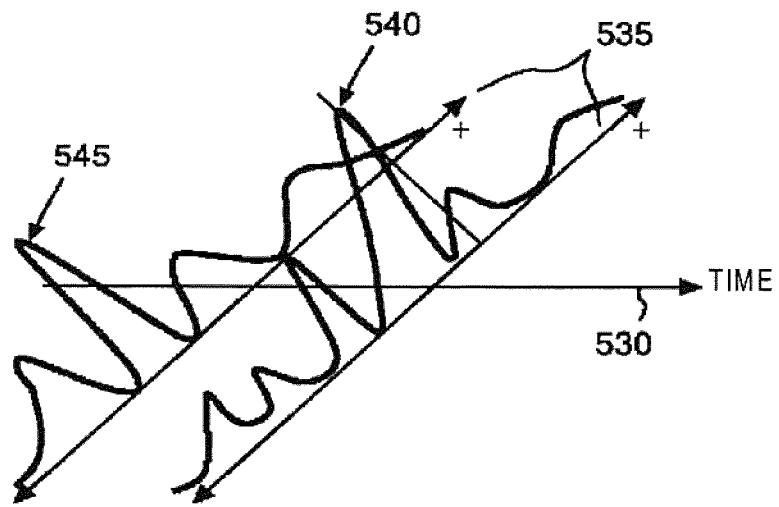

In the exemplary speech signal 500 illustrated in FIG. 5, the maximum value of the CSP coefficient can be obtained at the position indicated by arrow 520, at a distance in the negative direction from the reference position 505.

The time-series data generation unit 330 receives an output from the phase information obtaining unit 320 and arranges the maximum CSP coefficient values for pairs of consecutive frames in the order in which frames appear to generate time-series data of the maximum CSP coefficient values. The time-series data generation unit 330 then outputs the time-series data it generated as a speech feature.

FIG. 5(b) is a diagram comparing index values that maximize the CSP coefficient for two pairs of consecutive frames. Arrow 540 in FIG. 5(b) indicates the maximum values of the CSP coefficient for frames 2 and 3 and arrow 545 indicates the maximum value of the CSP coefficient for frames 1 and 2. As can be seen, the index value that maximizes CSP coefficient value varies from frame to frame. The indices that maximize the CSP coefficient values for different frames are independent of one another.

Figure 6:
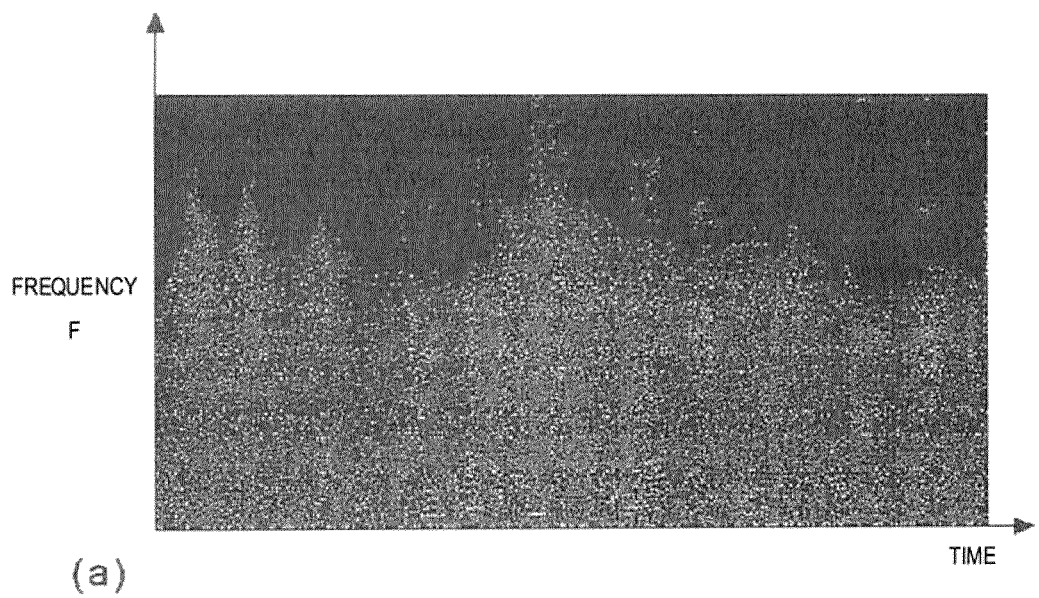
FIG. 6(a) is a diagram illustrating sample speech input in the speech signal processing system 300 according to the embodiment of the present invention.
FIG. 6(b) illustrates time-series data of maximum values of the CSP coefficient obtained by the speech signal processing system 300 according to the embodiment of the present invention when the sample speech illustrated in FIG. 6(a) is input in the speech signal processing system 300.
Figure 6:
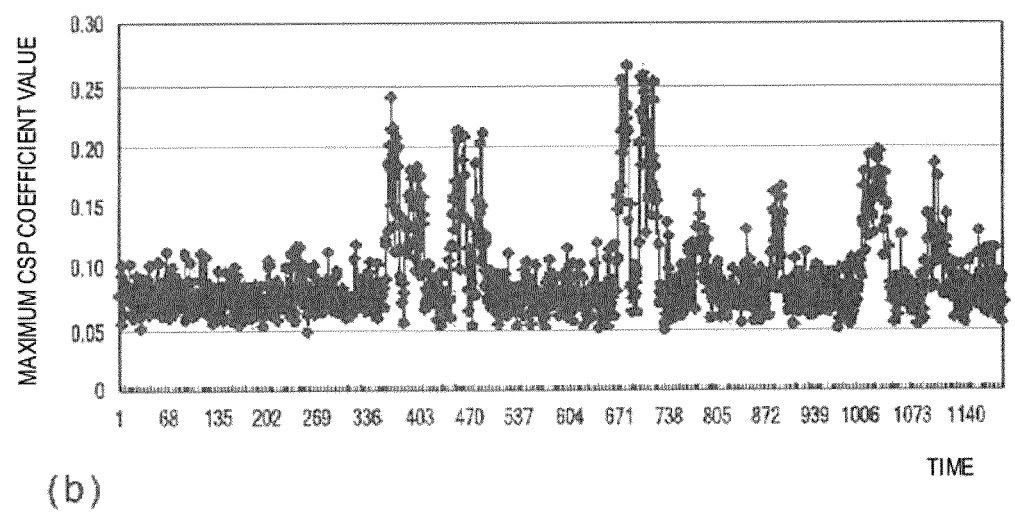

By arranging the maximum CSP coefficient values obtained for pairs of consecutive frames in the order in which frames appear, time-series data in which the value is high in the positions where vowels appear can be obtained. FIG. 6 illustrates time-series data of the maximum CSP coefficient values, which is output as a speech feature by the speech signal processing system according to the embodiment of the present invention. FIG. 6(a) illustrates sample speech input in the speech signal processing system 300. FIG. 6(b) illustrates time-series data of the maximum CSP coefficient values obtained when the sample speech illustrated in FIG. 6(a) was input.

Figure 7:
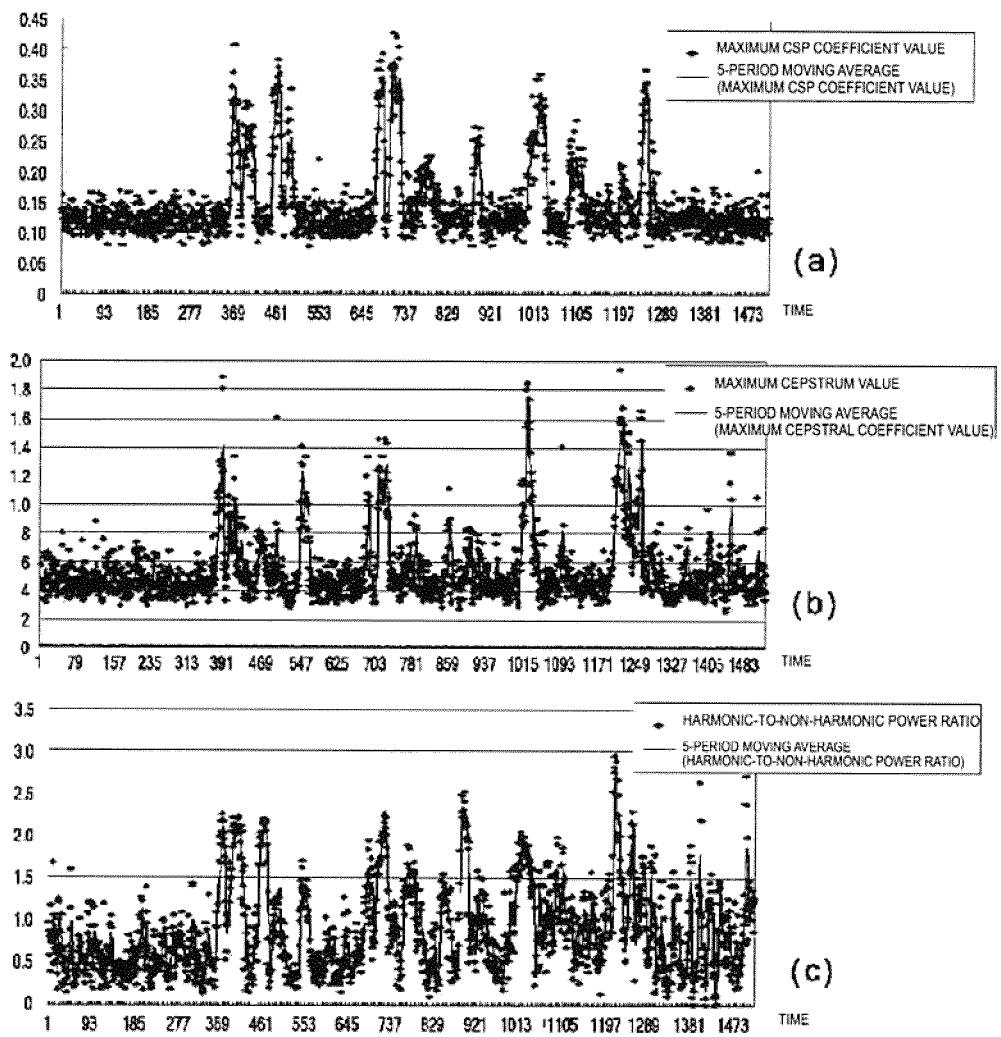
FIG. 7(a) illustrates an example of time-series data of maximum values of the CSP coefficient obtained by the speech signal processing system 300 according to the embodiment of the present invention.
FIG. 7(b) illustrates an example of time-series data of the ratio between the power of a harmonic wave and the power of non-harmonic wave.
FIG. 7(c) illustrates an example of time-series data of maximum cepstrum values.

As can be seen from comparison between FIGS. 6(a) and 6(b), the value is high in the positions of vowels in the time-series data of the maximum CSP coefficient values. This means that the time-series data of the maximum CSP coefficient values can be used to identify vowel parts even in the presence of nonstationary background noise. For comparison, FIG. 7 illustrates the feature proposed by the present invention and conventional features. FIG. 7(a) illustrates time-series data of the maximum CSP coefficient values output from the speech signal processing system 300 according to the embodiment of the present invention; FIG. 7(b) illustrates time-series data of maximum cepstrum values; and FIG. 7(c) illustrates time-series data of the power ratio between harmonic and non-harmonic. All of the data were calculated using the sample speech illustrated in FIG. 6(a) as the input speech.

Comparison among the three sets of time-series data shows that the peaks and valleys in the time-series data in FIG. 7(a) are clearly discernible whereas in the conventional time-series data in FIGS. 7(b) and 7(c), peaks, although low, appear in the regions other than vowel parts and there are considerable variations in the non-vowel parts.

Thus, the time-series data of the maximum CSP coefficient values output as a speech feature from the speech signal processing system 300 according to the embodiment of the present invention is a steady index insusceptible to spectral envelope due to the whitening effect. Accordingly, by using the time-series data of maximum CSP coefficient values in addition to other features in speech recognition, the accuracy of speech recognition can be improved under a very low SNR condition as well.

Referring back to FIG. 3, the vowel enhancement unit 340, the masking unit 345 and the feature vector calculation unit 335 will be described. The vowel enhancement unit 340 receives an output from the discrete Fourier transform unit 310 and an output from the phase information obtaining unit 320 as its inputs, matches the phases of the spectra of each pair of consecutive frames on the basis of the index K expressed by Equation 2 that maximizes the CSP coefficient of the pair, and adds the spectra together.

The index K that maximizes the CSP coefficient of each pair of consecutive frames which is obtained by the phase information obtaining unit 320 corresponds to the phase lag between the frames. Accordingly, the phases of the frames can be matched by correcting the phase of one of the frames on the basis of the index k. Adding the spectra of the phase-matched frames together can enhance the speech having the phase (mostly a vowel). Consequently, noise can be relatively weakened.

The index K expressed by Equation 2 is a representation of the phase lag of the spectra of both frames on the time level (the number of samples). The vowel enhancement unit 340 first transforms the index K representing the time lag into the phase lag between the two frames as:

$$\tau(j)=2\pi \cdot K \cdot j/m \quad \text{[Equation 3]}$$

where $\tau$ is the quantity of phase to be corrected and K is the index that maximizes the CSP coefficient, expressed by Equation 2, j is the frequency bin number of discrete Fourier transform, and m is the length, (the number of samples) of the discrete Fourier transform. The frequency bin number, j, can be obtained as j=w·m/f, where f is sampling frequency and w is frequency.

Based on the index K that maximizes the value of the CSP coefficient for the T−1-th and T-th frames, the vowel enhancement unit 340 uses $\tau$ to correct the phase of the T−1-th frame and adds the phase-corrected spectrum to the spectrum of the T-th frame. The phase corrected spectrum $S'_{T-1}(j)$ can be calculated by $$S'_{T-1}(j)=S_{T-1}(j)\cdot exp(i\cdot \tau(j)) \quad \text{[Equation 4]}$$

where $S_{T-1}(j)$ is the spectrum of the T−1-th frame. Herein, i is an imaginary number.

The feature vector calculation unit 335 receives an output from the vowel enhancement unit 340 as an input and extracts a speech feature from the input. The feature vector calculation unit 335 outputs the extracted speech feature, together with the time-series data of the maximum CSP coefficient values output from the time-series data generation unit 330, as a speech feature vector. Here, the feature that the feature vector calculation unit 335 extracts from the vowel-enhanced spectrum input from the vowel enhancement unit 340 can be any feature that can be calculated with a known calculation method, for example a combination of a cepstral coefficient such as an MFCC and its delta (first-order difference) or delta-delta (second-order difference), or linear transforms of these.

The masking unit 345 receives an output from the discrete Fourier transform unit 310 and an output from the phase information obtaining unit 320 and, for each pair of consecutive frames, calculates a masker that weakens the spectrum of a frequency bin in which the signs of the spectra of the pair do not match when the spectra are compared with each other in the position where the phase lag between the spectra is minimized on the basis of the index K expressed by Equation 2 that maximizes the corresponding CPS coefficient. The masking unit 345 applies the masker to the spectrum of one of the pair of frames.

There are multiple possible maskers g(j). One exemplary masker can be obtained by:

$$g(j)=0.5\cdot(1.0+\cos(\theta(j)-\theta'(j)))$$

$$\theta_T(j)=\angle S_T(j)$$

$$\theta'_{T-1}(j)=\angle S'_{T-1}(j) \quad \text{[Equation 5]}$$

where $S_T(j)$ is the spectrum of the T-th frame, $\theta_T(j)$ is the phase, $S'_{T-1}(j)$ is the phase-corrected spectrum of the T−1-th frame, $\theta'_{T-1}(j)$ is the phase, and j is the frequency bin number of discrete Fourier transform. The spectrum $S''_T(j)$ after the masker g(j) is applied to the spectrum $S_T(j)$ of the T-th frame can be expressed as:

$$S''_T(j)=g(j)\cdot S_T(j) \quad \text{[Equation 6]}$$

The masker g(j) weakens the spectrum of a frequency bin in which the signs of the spectra of a pair of consecutive frames do not match when the pair of frames are compared with each other in the position where the phase lag between the spectra is minimized. Accordingly, the masker g(j) has the effect of weakening sound from a non-harmonic structure in a vowel part. As a result, noise can be relatively weakened.

The feature vector calculation unit 335 receives an output from the masking unit 345 as an input and extracts a speech feature from the input. The feature vector calculation unit 335 outputs the extracted speech feature, together with the time-series data of the maximum CSP coefficient values output from the time-series data generation unit 330, as a speech feature vector. Here, the input from the masking unit 345 is a spectrum in which sound from a non-harmonic structure is weakened. The feature that the feature vector calculation unit 335 extracts from the input from the masking unit 345 can be any feature that can be calculated with a known calculation method, for example a combination of a cepstral coefficient such as an MFCC and its delta (first-order difference) or delta-delta (second-order difference), or linear transforms of these.

An experiment for evaluating speech recognition using the feature proposed by the present invention will be described with reference to FIG. 8. An in-car speech recognition evaluation database, CENSREC-2 (Corpus and Environment for Noisy Speech RECognition 2), developed by the Noisy Speech Recognition Evaluation working group of Special Interest Group on Spoken Language Information Proceedings of the Information Society of Japan (IPSJ), was used in the evaluation experiment described below with reference to FIG. 8.

The evaluation experiment was conducted in six environments that are combinations of three cruising speeds (idling, low-cruising and high-cruising speeds) with two in-car environments (with and without air-conditioning). The feature specified as the baseline in the table is a vector having 39 dimensions in total: 2 dimensions of MFCC as static feature, 12 dimensions of delta MFCC as delta feature, 12 dimensions of delta-delta MFCC as delta-delta feature, and other 3 dimensions, i.e. logarithmic power of speech and its delta and delta-delta.

In a first evaluation experiment, time-series data of maximum CSP coefficient values proposed by the present invention was added to the 39-dimensional feature vector to make a 40-dimensional feature vector. The 40-dimensional vector was used to perform speech recognition and the results (the column "Inter-frame CSP feature" of the table in FIG. 8) were compared with the results of speech recognition using the 39-dimensional feature vector (the column "Baseline" of the table in FIG. 8).

The word recognition rates in all environments were improved by the present invention. Especially in the high-speed cruising without air-conditioning, the word recognition rate was improved from the baseline 79.29%, which is the result of the conventional speech recognition, to 86.12%. In the high-speed cruising with air-conditioning, the word recognition rate was improved from the baseline 79.65%, which is the result of the conventional speech recognition, to 83.44%. The feature of the time-series data of maximum CSP coefficient values proposed by the present invention significantly improved the speech recognition rate under very low SNR conditions. The evaluation experiment proved the effectiveness of the time-series data as a feature in reverberant environments.

In a second evaluation experiment, the results of speech recognition performed by using the 39-dimensional feature extracted from spectra subjected to the vowel enhancement pre-processing proposed by the present invention (the column "Inter-frame DS" of the table in FIG. 8) were compared with the results of speech recognition using the 39-dimensional feature vector extracted from spectra without being subjected to the pre-processing (the column "Baseline" of the table in FIG. 8). In the second evaluation experiment, the word recognition rate in the high-speed cruising without air-conditioning was improved from the baseline 79.29%, which is the result of the conventional speech recognition, to 85.82%. The word recognition rate in high-speed cruising with air-conditioning was improved from the base line 79.65%, which is the result of the conventional speech recognition, to 82.21%.

In a third evaluation experiment, the results of speech recognition performed using the 39-dimensional feature extracted from spectra subjected to the masking pre-processing proposed by the present invention (the column "Soft mask" of the table in FIG. 8) were compared with the results of speech recognition using the 39-dimensional feature vector extracted from spectra without being subjected to the pre-processing (the column "Baseline" of the table in FIG. 8).

In the third evaluation experiment, the word recognition rate in high-speed cruising without air-conditioning was improved from the baseline 79.29%, which is the result of the conventional speech recognition, to 85.51%. The word recognition rate in high-speed cruising with air-conditioning was improved from the baseline 79.65%, which is the result of the conventional speech recognition, to 82.72%.

As has been described above, both of the two types of pre-processing, the vowel enhancement and masking, proposed by the present invention improved the speech recognition rate under very low SNR conditions. Thus, the evaluation experiments have shown that the vowel enhancement and the masking are effective as pre-processing for removing the influence of noise in reverberant environments.

While the present invention has been described with embodiments thereof, the technical scope of the present invention is not limited to the scope described in the embodiments. It will be obvious to those skilled in the art that various modifications or improvement can be made to the embodiments described above. Therefore, it will be understood that embodiments to which such modifications or improvements were made also fall within the technical scope of the present invention.

The invention claimed is:

1. A speech signal processing system, comprising:
   a framing unit configured to divide an input speech signal into frames, wherein a pair of consecutive frames has a frame shift length equal to at least one fundamental period of the input speech signal, and the pair of consecutive frames has an overlap equal to at least a predetermined length;
   a discrete Fourier transform unit configured to apply a discrete Fourier transform to each of the frames and output a spectrum of the input speech signal;
   a Cross-Power Spectrum Phase (CSP) coefficient calculation unit configured to calculate a CSP coefficient of the spectrum of each pair of consecutive frames;
   a phase information obtaining unit configured to receive an output from the CSP coefficient calculation unit, and to search a predetermined search range for a maximum CSP coefficient value for each pair of consecutive frames, so as to obtain an index that maximizes the CSP coefficient value for each pair of consecutive frames;
   a time-series data generation unit configured to arrange the maximum CSP coefficient values for pairs of consecutive frames in the order in which the frames appear so as to generate time-series data; and
   a vowel identification unit configured to use the time series data of the maximum CSP values to identify vowel parts of the input speech signal.

2. The system of claim 1, wherein the pair of consecutive frames comprises an earlier frame and a later frame, wherein the predetermined search range is a range from $-L/2$ to $+L/2$ with respect to a start position of the later frame, and wherein L is 10 milliseconds.

3. The system of claim 1, wherein the frame shift length is 10 milliseconds.

4. The system of claim 1, further comprising:
   a vowel enhancement unit configured to match, for each pair of consecutive frames, phases of spectra of the pair of frames on the basis of the value of an index that maximizes the CSP coefficient obtained for the pair of frames in the predetermined search range, and to add the spectra together; and
   a feature vector calculation unit configured to receive an output from the vowel enhancement unit as an input, extract a speech feature from the input, and output the speech feature along with the time-series data of the maximum values of the CSP coefficient as a speech feature vector.

5. The system of claim 1, further comprising:
   a masking unit configured to calculate, for each pair of consecutive frames, a masker that weakens a frequency bin in which the signs of spectra of the pair do not match when the spectra are compared with each other in a position in which a phase lag between the spectra is minimized on the basis of the value of an index that maximizes the CSP coefficient obtained for the pair in the predetermined speech range, and to apply the masker to the spectrum of one frame of the pair; and
   a feature vector calculation unit configured to receive an output from the masking unit as an input, extract a speech feature from the input, and output the speech feature along with the time-series data of the maximum values of the CSP coefficient as a speech feature vector.

6. A method of processing a speech signal, the method comprising:
   dividing, using a framing unit, an input speech signal into frames, wherein a pair of consecutive frames has a frame shift length equal to at least one fundamental period of the input speech signal, and the pair of consecutive frames has an overlap equal to at least a predetermined length;
   applying, using a discrete Fourier transform unit, a discrete Fourier transform to each of the frames and outputting a spectrum of the input speech signal;
   calculating, using a Cross-Power Spectrum Phase (CSP) coefficient calculation unit, a CSP coefficient of the spectrum of each pair of consecutive frames;
   receiving, using a phase information obtaining unit, an output from the CSP coefficient calculation unit, and searching a predetermined search range for a maximum CSP coefficient value for each pair of consecutive frames, so as to obtain an index that maximizes the CSP coefficient value for each pair of consecutive frames;
   arranging, using a time-series data generation unit, the maximum CSP coefficient values for pairs of consecutive frames in the order in which the frames appear so as to generate time-series data; and
   using the time series data of the maximum CSP values to identify vowel parts of the input speech signal.

7. The method of claim 6, wherein the pair of consecutive frames comprises an earlier frame and a later frame, wherein the predetermined search range is a range from −L/2 to +L/2 with respect to a start position of the later frame, and wherein L is 10 milliseconds.

8. The method of claim 6, wherein the frame shift length is 10 milliseconds.

9. The method of claim 6, further comprising:

matching, using a vowel enhancement unit, for each pair of consecutive frames, phases of spectra of the pair of frames on the basis of the value of an index that maximizes the CSP coefficient obtained for the pair of frames in the predetermined search range, and adding the spectra together; and receiving, using a feature vector calculation unit, an output from the vowel enhancement unit as an input, extracting a speech feature from the input, and outputting the speech feature along with the time-series data of the maximum values of the CSP coefficient as a speech feature vector.

10. The method of claim 6, further comprising:

calculating, using a masking unit, for each pair of consecutive frames, a masker that weakens a frequency bin in which the signs of spectra of the pair do not match when the spectra are compared with each other in a position in which a phase lag between the spectra is minimized on the basis of the value of an index that maximizes the CSP coefficient obtained for the pair in the predetermined search range, and applying the masker to the spectrum of one frame of the pair; and receiving, using a feature vector calculation unit, an output from the masking unit as an input, extracting a speech feature from the input, and outputting the speech feature along with the time-series data of the maximum values of the CSP coefficient as a speech feature vector.

11. A computer program product comprising a non-transitory, computer readable storage medium having computer readable instructions stored thereon that, when executed by a computer, implement a method of processing a speech signal, the method comprising:

dividing, using a framing unit, an input speech signal into frames, wherein a pair of consecutive frames has a frame shift length equal to at least one fundamental period of the input speech signal, and the pair of consecutive frames has an overlap equal to at least a predetermined length;

applying, using a discrete Fourier transform unit, a discrete Fourier transform to each of the frames and outputting a spectrum of the input speech signal;

calculating, using a Cross-Power Spectrum Phase (CSP) coefficient calculation unit, a CSP coefficient of the spectrum of each pair of consecutive frames;

receiving, using a phase information obtaining unit, an output from the CSP coefficient calculation unit, and searching a predetermined search range for a maximum CSP coefficient value for each pair of consecutive frames, so as to obtain an index that maximizes the CSP coefficient value for each pair of consecutive frames;

arranging, using a time-series data generation unit, the maximum CSP coefficient values for pairs of consecutive frames in the order in which the frames appear so as to generate time-series data; and using the time series data of the maximum CSP values identify vowel parts of the input speech signal.

12. The computer program product of claim 11, wherein the pair of consecutive frames comprises an earlier frame and a later frame, wherein the predetermined search range is a range from −L/2 to +L/2 with respect to a start position of the later frame, and wherein L is 10 milliseconds.

13. The computer program product of claim 11, wherein the frame shift length is 10 milliseconds.

14. The computer program product of claim 11, wherein the method further comprises:

matching, using a vowel enhancement unit, for each pair of consecutive frames, phases of spectra of the pair of frames on the basis of the value of an index that maximizes the CSP coefficient obtained for the pair of frames in the predetermined search range, and adding the spectra together; and receiving, using a feature vector calculation unit, an output from the vowel enhancement unit as an input, extracting a speech feature from the input, and outputting the speech feature along with the time-series data of the maximum values of the CSP coefficient as a speech feature vector.

15. The computer program product of claim 11, wherein the method further comprises:

calculating, using a masking unit, for each pair of consecutive frames, a masker that weakens a frequency bin in which the signs of spectra of the pair do not match when the spectra are compared with each other in a position in which a phase lag between the spectra is minimized on the basis of the value of an index that maximizes the CSP coefficient obtained for the pair in the predetermined search range, and applying the masker to the spectrum of one frame of the pair; and receiving, using a feature vector calculation unit, an output from the masking unit as an input, extracting a speech feature from the input, and outputting the speech feature along with the time-series data of the maximum values of the CSP coefficient as a speech feature vector.

* * * * *